Jan. 17, 1961 R. E. McCLURE 2,968,112
FISH LINE RETRIEVER WITH CUTTING BLADE
Filed June 4, 1959
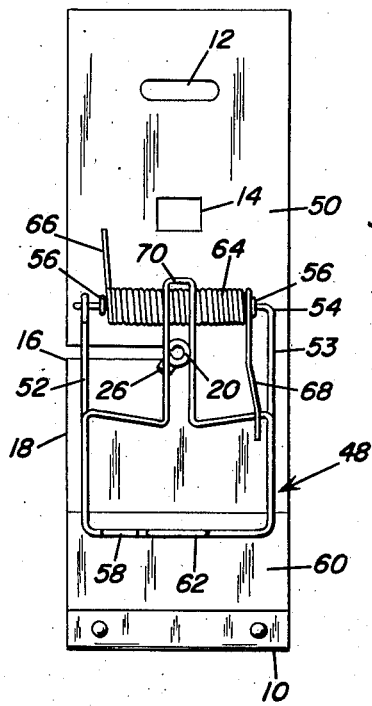
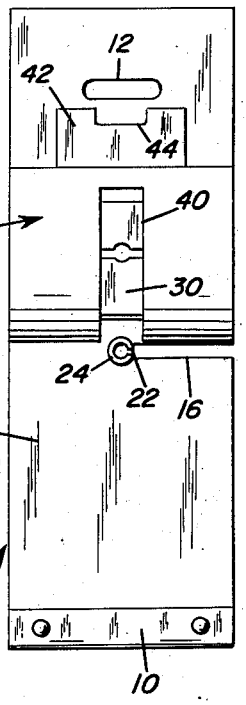
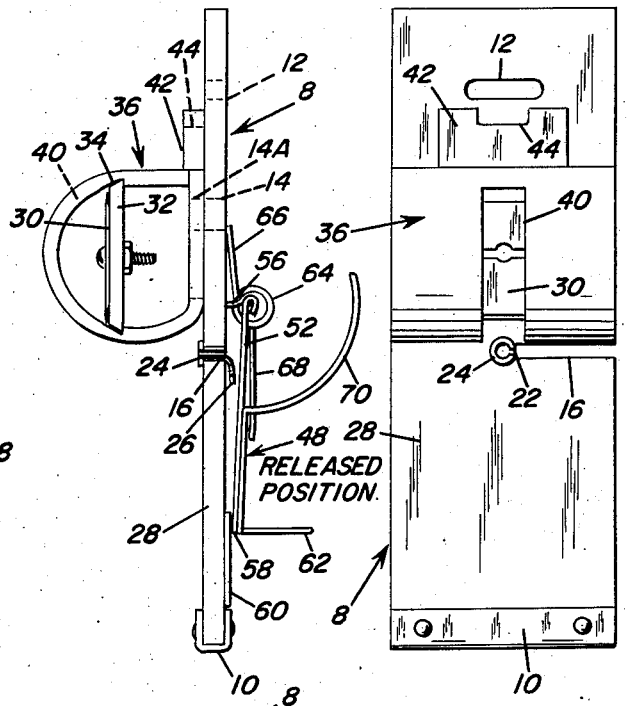
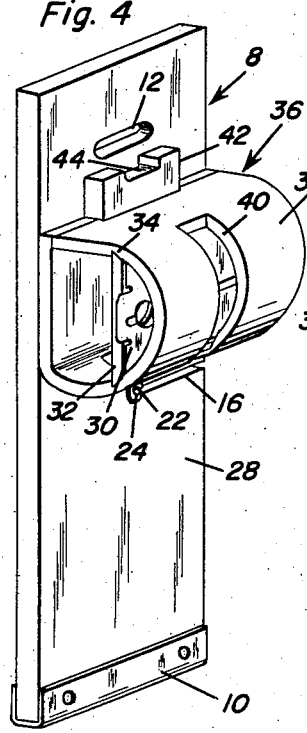
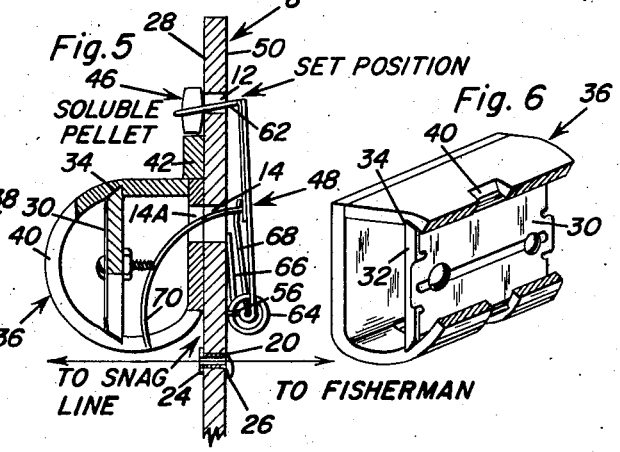
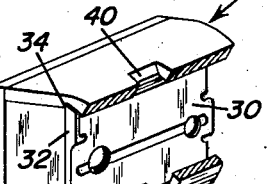
Robert E. McClure
INVENTOR.

United States Patent Office 2,968,112
Patented Jan. 17, 1961

2,968,112

FISH LINE RETRIEVER WITH CUTTING BLADE

Robert E. McClure, 47 Ehle Ave., Coraopolis, Pa.

Filed June 4, 1959, Ser. No. 818,046

6 Claims. (Cl. 43—17.2)

This invention relates to an improved fishing line retriever which may be detachably and slidingly attached by a fisherman to a snagged line, which then slides down the line to the place where the line has become snagged and which is equipped with novel means which functions automatically to grip and clamp a portion of the line thereto, and is provided with a fixed razor blade or the like which serves to cut the portion of the line between the location of the snag and the retriever.

Contrivances for "cutting" and then retrieving a snagged fishing line are apparently few. In fact, the only one known to your applicant is that disclosed in U.S. Patent No. 2,593,716, but this one, like all prior art retrievers known to applicant, requires a separate pull-up or special remote controlled line. One improvement here, has to do with an automatic self-contained device which is apparently original in that it is attached to the fishing line itself, descends thereon, clamps thereto at the predetermined time and is retrieved with the line after, of course, the line has been cut and freed from the obstacle on which it is hung or otherwise snagged.

Briefly, the retriever herein disclosed is characterized by a panel, or a plate, which is provided with means permitting the same to be readily attached to and subsequently detached from the fishing line. This means is such, as already suggested, that it allows the retriever to be mounted on the fishing line and, since it is of sufficient weight, to ride down the line to the place where the line has become caught or snagged on some obstacle or object in the water. The panel is provided on one side with a suitably shielded cutting blade, said blade being fixed and a restricted portion thereof being exposed so that when the line adjacent thereto is brought against the cutting edge it will be cut. Means is provided on the opposite side of the panel which is so constructed and arranged that a portion thereof functions to pin a portion of the line between the means and the panel. This operation results in the panel becoming connected with the line. In fact, the means subjects the panel to a jarring action which under most conditions, where the line is held sufficiently taut, causes the cutting edge of the blade to be forcibly driven against the taut line to cut the same. Then the fishing line and the attached retriever can be reeled in and brought to the surface.

Stated otherwise and somewhat more specifically the invention comprises a device which both cuts and retrieves the line, said device being attachable to and slidable on the fishing line itself and which therefore does not require a separate line for either remote controlling or hauling in the retrieved fishing line. This device comprises a panel providing a base, said panel having a keyhole-shaped slot the restricted end of which opens through one marginal edge of the panel to allow the fishing line to be manually inserted and shoved into the enlarged line seating end of the slot, means mounted in the enlarged slot-end for retaining the line and attaching the panel in a manner to slide downwardly on the line toward the snagged end of the line, cutting means mounted on the panel adjacent to the slot, a spring-loaded line pinning trap hingedly mounted on one face of the panel and having a spring-biased bar portion which is automatically sprung to a position, when operated, to pin a portion of the line between itself and a cooperating surface on said panel thus to clamp the panel to the line to be retrieved therewith, said line cutting means serving to cut the line between the snag and place where the line has been clamped to said panel, whereby the salvaged line and the attached device may both be retrieved.

Features and advantages not so far touched upon will become self-evident when the over-all disclosure has been considered and comprehensively understood.

In the drawing:

Fig. 1 is a front view in elevation of a fishing line retriever embodying the invention and showing the spring-loaded trap in a sprung position.

Fig. 2 is an edge view of Fig. 1 from left to right.

Fig. 3 is a view in elevation of the reverse side of the device, a view looking at Fig. 2 in a direction from left to right.

Fig. 4 is a perspective view showing the cutting blade and its housing or shield.

Fig. 5 is a view of a fragmentary type with parts in section and elevation and showing the "trap" set and ready to function.

Fig. 6 is a perspective view of the cutting blade and its shield with a portion of the shield broken away to expose the blade.

Fig. 7 is a perspective view of a slotted sleeve hereinafter referred to.

By way of introduction to the description of the details it is believed that a general interpretation of the nature of the invention will be clear by observing that the panel or base seen in Fig. 1 resembles, broadly visualized, a mousetrap. In fact, the line trap has the general resemblance of a spring-biased or spring-loaded frame with trip or trigger means and wherein the construction is such that the trap is set as seen in Fig. 5 using a soluble pellet. When the pellet, which is subject to melting in the water, is dissolved the trap comes into play and shifts from the position seen in Fig. 5 to that seen in Fig. 2 where the line is pinned down and clamped.

The panel which is rectangular, but which may be of any shape and material, is denoted by the numeral 8. It might also be called a "base" in that it is the part on which the other components are based or mounted. The panel may be of wood, plastic or metal. Where it is itself too light to function, an added weight 10 may be provided at the bottom. This may be a sheet of lead or the like channelled and fastened in place. As seen in Fig. 1 there is an elongated slot 12 at the top. Below this there is a generally rectangular hole 14. Then and below that there is a keyhole shaped slot the inner enlarged end of which is at the central or median portion of the panel. The restricted or entrance portion 16 is at right angles to the panel and opens through the marginal edge 18. This keyhole slot constitutes the means whereby the panel may be detachably and slidably mounted on the fishing line. So that the line will not be displaced once it is positioned by hand a retainer is provided. This comprises a simple sleeve 20 of the type seen in Fig. 7. The sleeve is provided in one side with a line inlet and retaining slot 22. At one end there is a flange 24 which is positioned as seen for example in Figs. 2–5, inclusive. The laterally bent end 26 of the sleeve provides a finger piece and is located as perhaps best shown in Figs. 2 and 5. This provides a means to turn the sleeve so that a slot 22 may be alined with the slot 16 when the line is put into position. Then after the line is in place the finger piece is turned and the slot 22 is disalined with the slot 16 and thus the fishing line is in position, that is the panel is attached to the line and yet the panel may slide or gravitate down the line in an obvious manner. Referring to what may be called the rear side of the panel as seen in Fig. 4 at 28 the cutting blade means is illustrated. This comprises a simple razor blade 30 mounted on an insert or backing member 32 which is removably keyed in suitable grooves or channels 34 provided therefor in the curvate portion of the housing or shield 36. This part 36 is suitably mounted on the panel. The bowed portion 38 is provided with a central slot 40 to expose an edge of the blade for cutting purposes as perhaps best understood when considering Fig. 5. The cutting edge is parallel with the keyhole shaped slot as is obvious. The numeral 42 designates a block-like member which is fastened on the panel above the shield and which has a keeper notch 44 therein just below and in parallelism with the trigger slot 12. The notch serves to accommodate the water soluble pellet 46 in the manner illustrated in Fig. 5.

The automatic line trap, that is means for pinning the fishing line on the panel or, conversely, attaching the panel to the line is denoted generally by the numeral 48. This trap is on the front side or surface 50 of the panel. It comprises a generally rectangular frame the side arms 52 and 53 of which join with a shaft 54 which is journalled for rotation in screw eyes or the like 56 on the panel between the hole 14 and the slot 16. The transverse frame member 58, which may be called a line clamping bar is cooperable with a shock-absorbing pad or pin-down anvil 60 which is suitably fixed on the surface 50 at the position shown. This portion 58 is provided with a generally U-shaped trigger 62 which is located so that it may be pushed through the slot 12 to line up with the seat 44 and to permit the pellet to be seated and also saddled in place for operation. The trap is sprung from the position seen in Fig. 5 to that seen in Fig. 2 by way of a coil spring 64 which encircles the shaft and has one terminal 66 bearing against the panel and the other terminal 68 bearing against a cooperating portion of the spring-loaded frame. The frame is also provided with an elongated arcuate U-shaped safety finger 70 which is centrally positioned to register with the slotted sleeve 20 and also the hole 14. This hole 14 in turn registers with a companion hole 14a formed in the adjacent wall of the blade shield 36 as shown in Fig. 5. This finger serves to stabilize the action of the trap. It also provides a finger-grip to assist in setting the trap. Then too, it straddles the line so that when the trap is sprung it assists in pinning down the line against the anvil 60. When the trap is set this finger extends through the holes 14 and 14a and into the housing and in fact into the lower portion of the arcuate slot 40. It follows that when the trap is set as seen in Fig. 5 the U-shaped trigger or trip 62 has been pressed or pushed through the slot 12 and the soluble tablet or pellet is then put in place to keep the trap set. At the same time the elongated arcuate finger 70 has been utilized in assisting the fisherman in setting the trap and in stabilizing the set position of the trap and performing the other functions already mentioned.

In operation it is to be understood that the fisherman desiring to bring the automatic retriever into play first sees that the slot 22 in the rotatable sleeve 20 has been lined up with the restricted portion 16 of the keyhole shaped slot. Then the fishing line can be inserted through the slot 16 and seated in the bore of the sleeve. Next the finger piece 26 of the sleeve is operated to turn the sleeve slightly so that the slot 22 is now out of line with the slot 16 and consequently the device is ready to slide down the line by gravity and because of the weight which it possesses. When the device reaches the place where the line has become hung-up it will come to rest or substantially so. After a reasonable time the soluble pellet 46 will dissolve and consequently the trap 48 will be tripped or released. The spring means will quickly bring the trap into play and the finger 70 will arch over the line and push the line down against the anvil 60. In any event the portion of the line which may be said to be between the fisherman and the device will be pinned down by the clamping action of the bar 58. At the same time this strong impact of the trap clamping the line against the panel will also impart a lever-like action to the panel with the result that the portion of the line to the left in Fig. 5 will find its way into the slot 40 and against the edge of the blade and will be cut. Since the fisherman is supposedly holding the fishing line tight when the trap goes off or functions the action will be felt through the fishing line. Consequently if the line has not been cut as contemplated by the action of the device, yanking the line several or more times will result in the line, that is the portion to the left in Fig. 5 finding its way into the slot and being cut. It is clear that the device itself will be clamped on the line so that it will be retrieved with the line. It is again emphasized in this connection that it is of great advantage in this automatic device that no other line is necessary.

With further reference at this time to the aforementioned finger 70 this part is also sometimes referred to as a line protecting guard and also a safety bar. The significance of the use "safety" here is primarily protection against premature or accidental cutting of the line. This aspect of the matter will be clear when it is remembered that when the retriever is cocked and ready to be used it is at this cocked stage that the line safety bar 70 is in position to do its work. More particularly when the retriever is put on the fishing line and allowed to descend the line it is quite likely that at the time it strikes the surface of the water it may rock in different directions because of the disturbing forces of the water and the angle at which the device strikes the water surface. Under the circumstances it is quite possible that the blade unless the line were guarded might accidentally nip the line and in fact undesirably cut it. So, to guard against and prevent this accidental line severage the safety bar goes through the slot 40 in the working end of the line safety bar. Note for example Fig. 5. This keeps the fishing line from being cut by the blade. In fact the bight portion of the U forming the arcuate finger constitutes the guard which bridges the line in the manner shown to offer the safety feature mentioned. This bight portion is the only actual part which guards the line. With reference to Fig. 5 showing the cocked position it can be seen that the bight portion of the U shaped arcuate finger is in a position where it would touch the line before the line accidentally strikes against the cutting edge of the blade. It follows that the blade does not touch the line until the retriever is all the way down to the bottom and the pellet has dissolved and the lever swings into play.

Since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fishing line cutting and retrieving device which is attachable to and slidable on the fishing line itself and which does not need a separate retrieving line for its use comprising a panel providing a base, said panel being provided with means for detachably and slidingly mounting the panel on the fishing line to descend the line to the place where the lower portion of the line has become snagged, line severing means mounted on said panel and located in a position to cut the line at the desired time, and additional means also mounted on the panel to clamp the panel to the line, said additional means being manually set in an inactive state and being mechanically held but automatically released and coming into play to clamp said panel to the line at a predetermined time.

2. The structure defined in claim 1, and wherein said line severing means comprises a fixedly mounted cutting blade housed in a safety shield provided therefor.

3. The structure defined in claim 1, and wherein said additional means comprises a spring-loaded pivotally mounted trap having a trigger, said trigger being adapted to be held in a trippable trap-releasing state by a water soluble pellet.

4. The structure defined in claim 1, and wherein said line severing means comprises a fixedly mounted cutting blade housed in a safety shield provided therefor, and said additional means comprising a pivotally mounted spring-biased trap having a portion to clamp and pin a portion of the line between itself and a surface of the panel, and having a trigger which is adapted to be normally set in a ready-to-operate position by a readily applicable water soluble pellet.

5. A fishing line cutting and retrieving device which is attachable to and slidable on the fishing line itself which does not need a separate retrieving line for its use comprising a panel providing a base, said panel having a keyhole-shaped slot the restricted end of which opens through one marginal edge of the panel to allow the fishing line to be manually inserted and shoved into the enlarged line seating end of the slot, means for attaching the panel to the line in a manner to slide downwardly on the line toward the snagged end of the line, line cutting means mounted on the panel adjacent to the slot, a spring-loaded line pinning trap hingedly mounted on one face of the panel and having a spring-biased bar portion which is automatically sprung to a position, when operated, to pin a portion of the line between itself and a cooperating surface on said panel thus to clamp the panel to the line to be retrieved therewith, said line cutting means serving to cut the line between the snag and place where the line has been clamped to said panel, whereby the salvaged line and the attached device may both be retrieved.

6. The structure defined in claim 5, and wherein said line attaching means comprises a slotted sleeve mounted for hand-regulated rotation in the enlarged end portion of said slot, said sleeve providing a line retainer whereby after the line has been passed through the slot in the sleeve and thus threaded through the sleeve said slot may be disaligned with the restricted end portion of the keyhole-shaped slot to prevent displacement of the threaded portion of the line.

No references cited.